| United States Patent [19] | [11] Patent Number: 5,004,307 |
| Kino et al. | [45] Date of Patent: Apr. 2, 1991 |

[54] NEAR FIELD AND SOLID IMMERSION OPTICAL MICROSCOPE

[75] Inventors: Gordon S. Kino, Santa Clara County; Scott M. Mansfield, San Mateo County, both of Calif.

[73] Assignee: The Board of Trustees of the Leland Stanford Junior University, Stanford, Calif.

[21] Appl. No.: 508,224

[22] Filed: Apr. 12, 1990

[51] Int. Cl.⁵ .......................... G02B 1/02; G02B 7/02; G02B 13/14; G02B 21/02

[52] U.S. Cl. ...................... 350/1.2; 350/1.4; 350/507; 350/527; 350/414; 350/255

[58] Field of Search ............... 350/507, 414, 1.2, 527, 350/255, 1.4

[56] References Cited

U.S. PATENT DOCUMENTS 3,524,694  8/1970  Klein .................................. 350/414
3,711,186  1/1973  O'Connor ........................... 350/414
3,912,378  10/1975 Goto .................................. 350/414
4,002,407  1/1977  Maeda ................................ 350/414

OTHER PUBLICATIONS

Ye. M. Brumberg et al., "Reflected-Light Contact Microscope", *Opt. Tech.*, vol. 39, No. 12, Dec. 1972, pp. 748–750.

Ye. M. Brumberg et al., "OLK-2 Adapters for Contact Microscopy", *Opt. Tech.*, vol. 38, No. 12, pp. 735–738.

*Primary Examiner*—Jon W. Henry
*Attorney, Agent, or Firm*—Flehr, Hohbach, Test, Albritton & Herbert

[57] ABSTRACT

An optical microscope which includes a high refractive index solid immersion lens interposed between the objective lens and the object being viewed to provide a microscope having resolution which is far better than the Rayleigh diffraction limit in air.

6 Claims, 3 Drawing Sheets

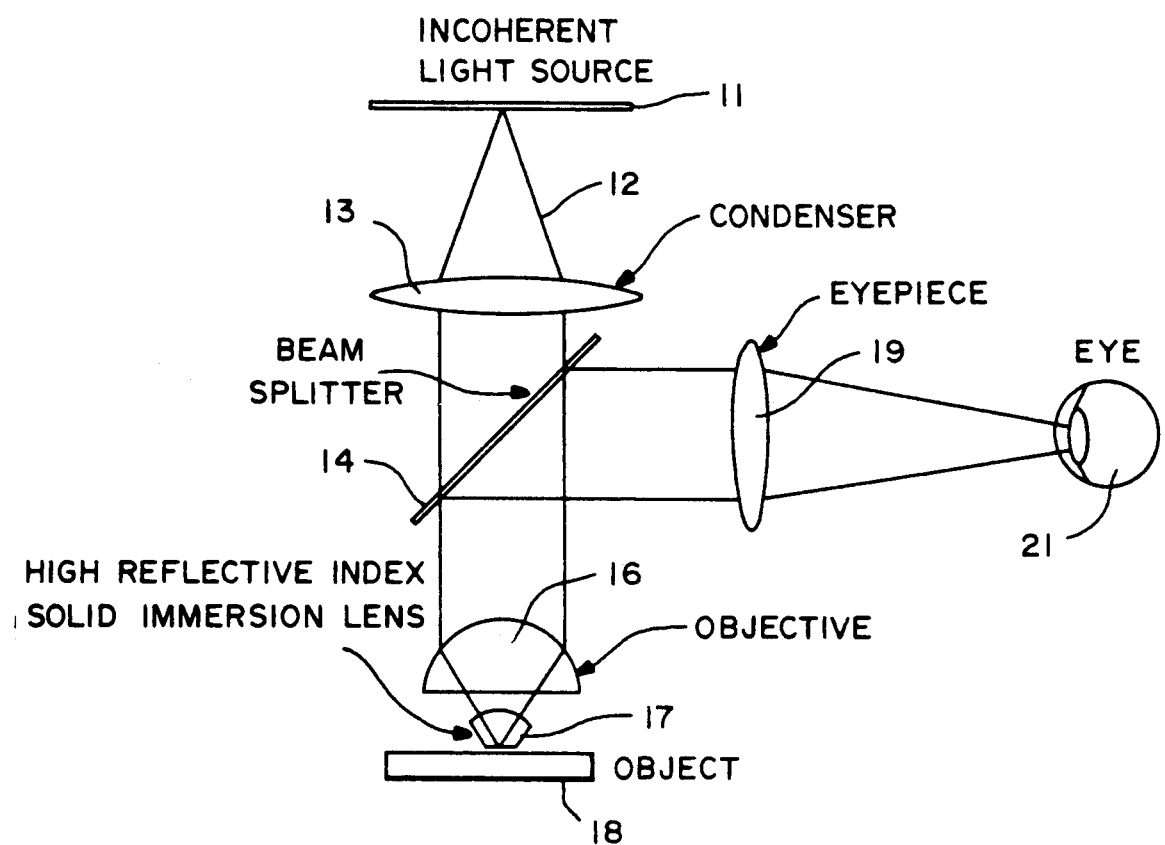
FIG.—1
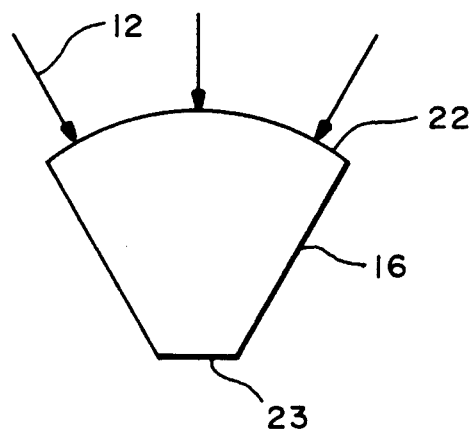
FIG.—1A

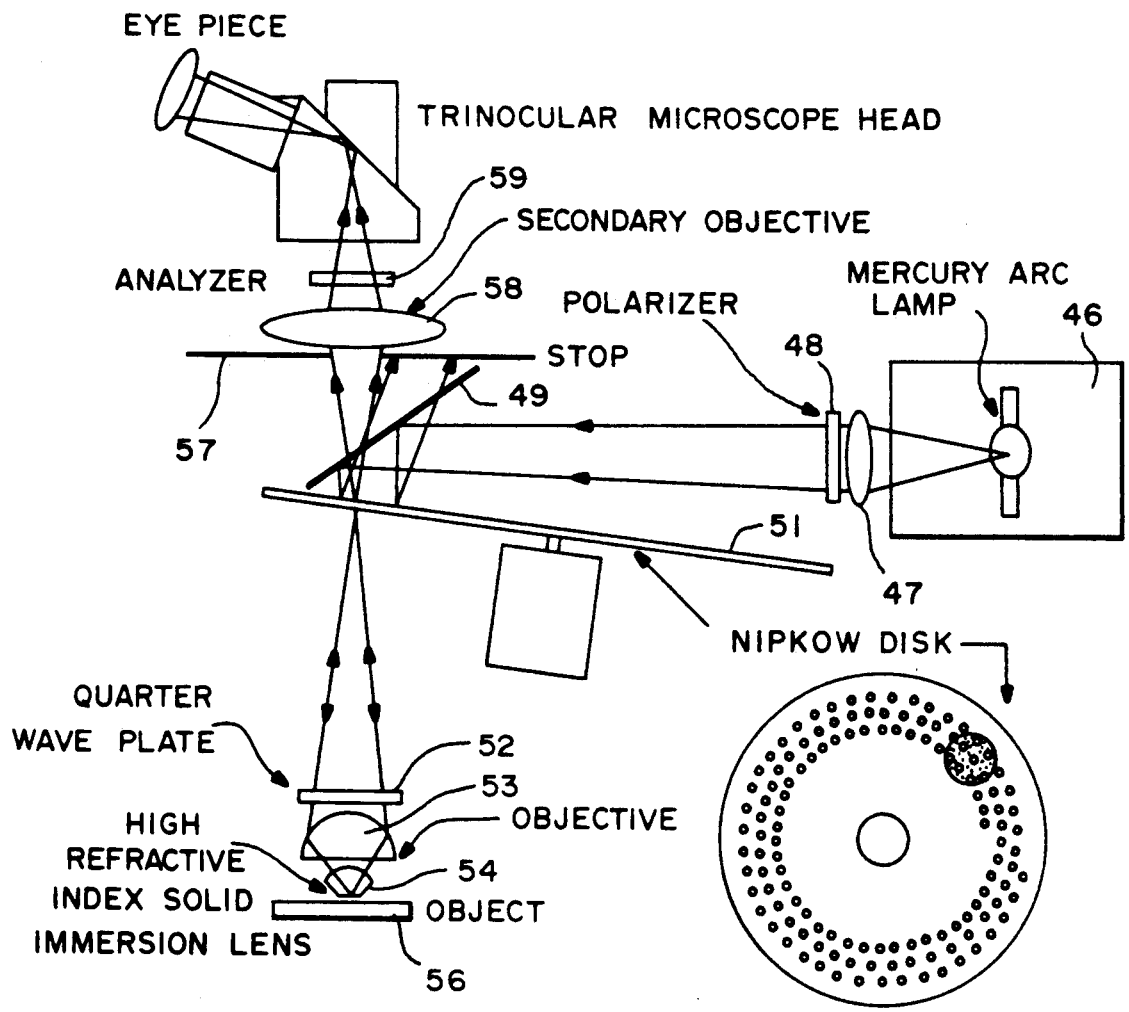
FIG.—2
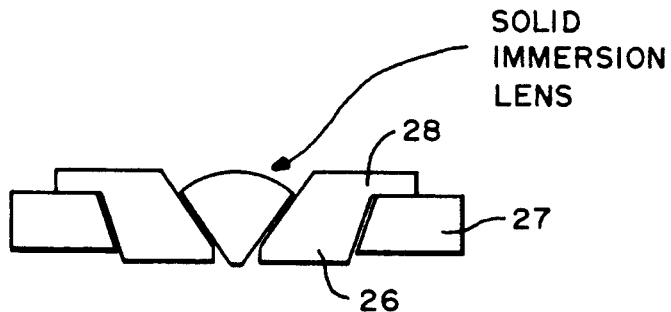
FIG.—3

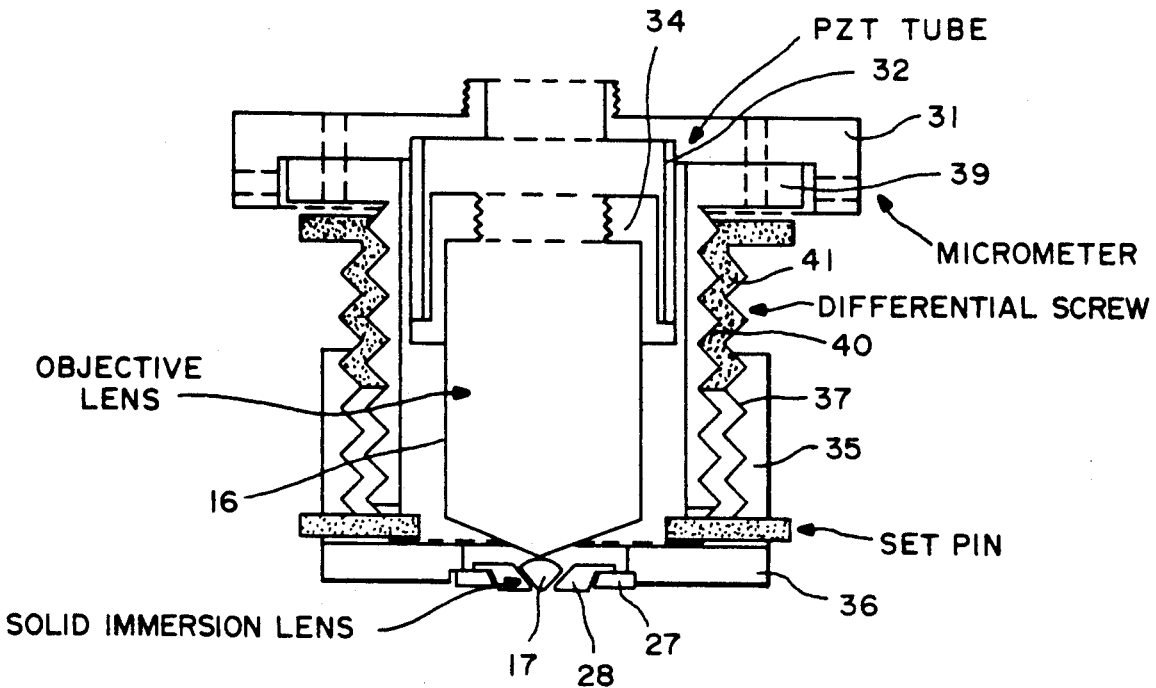
FIG.—4
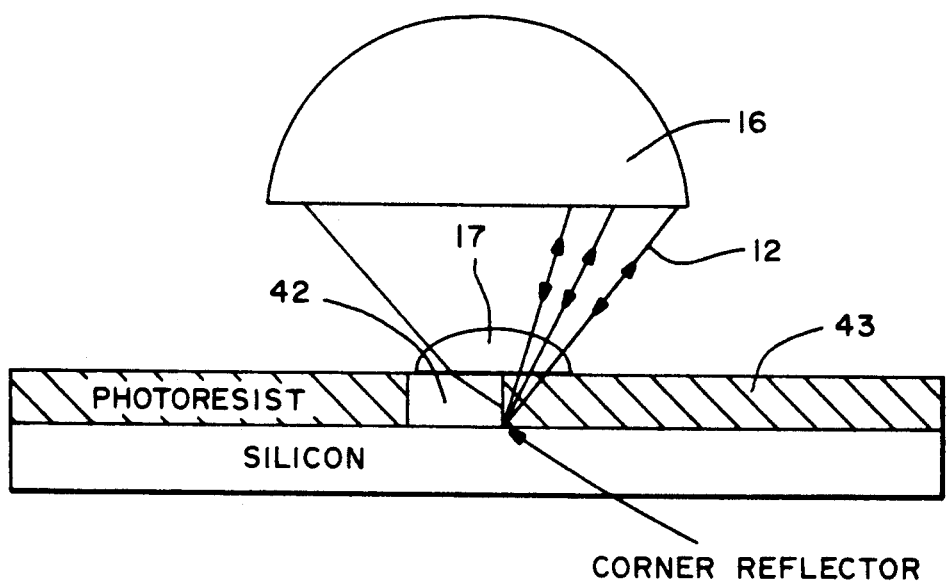
FIG.—5

NEAR FIELD AND SOLID IMMERSION OPTICAL MICROSCOPE

BRIEF DESCRIPTION OF THE INVENTION

This invention relates generally to optical microscopes and more particularly to near field and immersion optical microscopes having resolution better than the Rayleigh diffraction limit in air.

BACKGROUND OF THE INVENTION

Confocal, optical microscopes are not capable of obtaining a transverse resolution with a definition less than approximately a half wavelength of light due to the Rayleigh or Abbe limit. If a pinhole could be brought very close to the object and illuminated from the back, then the pinhole could be made very small and the definition would be determined essentially by the size of the pinhole. Such a device has been demonstrated by Pohl at IBM, Zurich, and by others. (See D.W. Pohl, W. Denk and M. Lanz, Appl. Phys. Lett. 44 652 (1984); E. Betzid, M. Isaacson and A. Lewis, "Collection Mode Near-Field Scanning Optical Microscopy," Appl. Phys. Lett. 51 2088-2090 (1987)) Pohl used a thin drawn down glass rod, coated with a thin metal film; the glass rod was pushed against an object to abrade a small pinhole in the film. Light was injected into the glass rod and passed through the pinhole. The first microscope was a transmission microscope; later, there was a demonstration of a reflection microscope to receive or transmit the light from a hollow cone outside the thin rod. The advantage of this microscope is its high definition. However, the light level is very low and mechanical scanning is required to view an area.

Scanning tunneling microscopes using mechanical scans to obtain definitions far smaller than an optical wavelength are well-known. Mechanical scanning is itself no longer the major problem, although it is slow and necessitates using a video display of the image. One problems associated with mechanical scanning systems of this nature is the difficulty of keeping the pinhole at the right height from the object. If it is too close, the pinhole itself is damaged and if it is too far away, the definition suffers. In scanning tunneling microscopes, the spacing is controlled by using the fact that the tunneling current varies exponentially at a very rapid rate with distance from the object. Thus it is possible to make a feedback system which maintains the height constant. In a near-field optical microscope, normally the variation with distance is not as rapid, so the negative feedback systems are not as accurate. Another difficulty with this kind of optical microscope is that the amount of light passing through the pinhole is, by necessity, small. Furthermore, in a reflection near field microscope, the light reflected from the object through the pinhole is small in intensity compared to the reflections from the surrounding medium.

OBJECTS AND SUMMARY OF THE INVENTION

It is an object of the present invention to provide a reflecting optical microscope having resolution better than the Rayleigh diffraction limit in air.

It is another object of the present invention to provide a near-field reflection optical microscope including a high refractive index solid immersion lens between the objective lens and the object being scanned to provide a near-field optical microscope.

It is a further object of the present invention to use the solid immersion lens (no longer confined to near field applications) to focus into the interior of a transparent sample of nearly the same refractive index as the solid immersion lens. This makes it possible to improve the definition by 1/n, where n is the refractive index of the material relative to air.

It is a further object of the present invention to provide an improved near-field scanning optical microscope.

It is a further object of the present invention to provide a near field optical microscope including a floating solid immersion lens assembly between the optical lens and the object being viewed.

It is still a further object of the present invention to provide a near field optical microscope which provides an image directly observable in real time.

The foregoing and other objects of the invention are achieved by an optical microscope of the type which includes an objective lens closely spaced to an object being viewed and a high refractive index solid immersion lens interposed between the objective lens and the object to illuminate and gather light from the object.

BRIEF DESCRIPTION OF THE DRAWINGS

FIG. 1 is a schematic diagram of a near field optical microscope in accordance with the invention.

FIG. 1A is an enlarged view of the immersion lens of FIG. 1.

FIG. 2 is a schematic diagram of a near field real time scanning optical microscope incorporating the present invention.

FIG. 3 is a sectional view of a mounting assembly for a sold immersion lens.

FIG. 4 is a detailed view showing a suitable mounting assembly for the objective and solid immersion lens.

FIG. 5 shows a near field confocal microscope employed to image the bottom of a trench in photoresist.

DETAILED DESCRIPTION OF THE INVENTION

Referring to FIG. 1, the microscope uses an incoherent light source and is substantially identical in overall construction to a standard microscope. In this regard, the incoherent light source impinges upon a spatial filter 11 which includes a pinhole to pass the light 12. A condenser lens 13 transmits the light to the objective lens 16 through a beam splitter 14. In accordance with the present invention, a high refractive index solid immersion lens 17 is disposed between the objective lens 16 and the object being viewed 18. The reflective light is gathered by the solid immersion lens 17 transmitted through the objective lens 16 to the beam splitter 14 which reflects the gathered light through an eyepiece 19 for viewing by the eye 21. The solid immersion lens, FIG. 1A, has a spherical surface 22 so that the light rays 12 from the objective lens are perpendicular or almost perpendicular to the surface and a flat front surface 23 which passes through the geometrical center of the spherical surface. This center is located on axis at the focus of the long focus microscope objective 16. A focused beam emitted from the objective lens 16 passes undeviated through the spherical surface of the near field lens 17 and is focused on the flat plane 23. Off-axis beams only make a small angle to the radius at which they enter and are focused with only a small aberration over the field of view whose width is w/n where w is the field of view in air using the same microscope objective and n is the index of refraction of the material forming the solid immersion lens. The definition obtained is on the order of $\lambda/2n$ where $\lambda$ is the wavelength in free space of the impinging light and n is the refractive index of the solid immersion lens. By using a solid immersion lens with a high refractive index, say on the order of 2.5, it is possible to obtain a resolution of better than 1000 Å at a wavelength of 4000 Å with a microscope objective with a numerical aperture N.A.O.8 in air.

In practice the solid immersion lens is placed either in contact with the object being examined or a few hundred Angstroms away from the sample. To facilitate placement of the solid immersion lens the lens is preferably mounted in a floating mount such as illustrated in FIG. 3. Use of the floating mount assures that neither the near field solid immersion lens nor the sample is scratched when these contact one another. The mount is designed to hold a solid immersion lens firmly in place while still allowing it to float if it is pushed from below. The mount consists of two parts: an inner ring 26 and an outer ring 27. The inner ring has a beveled hole with sidewalls that slope to match the conical shape of the solid immersion lens 17. The outer walls of the ring are also sloping, but only with a small angle to the normal of the bottom surface. This ring also has a small cap 28 at the top. The outer ring has an inner hole whose walls slope to match the outer walls of the inner ring. The solid immersion lens is held firmly in the bevelled hole of the inner ring by using wax or other suitable material. By applying pressure to the lens as it is waxed in place the flat part of the lens can be made parallel to the bottom of the mounting. The outer ring is held in fixed a position in the assembly and the inner ring sits inside of it using only gravity to hold it in place. Alternatively, a leaf spring could be used to provide predetermined pressure. The sloping walls of the inner and outer rings allow the inner ring to easily float up and out of the outer ring when any pressure is applied to the bottom of the lens. The walls are steep enough that the inner ring returns to its original position without tilting and without translating transversely when pressure is removed from the lower surface of the lens. The cap or the inner ring helps to keep the ring from tilting as it is returned to its original position.

A suitable assembly for mounting the objective lens and solid immersion lens in a microscope is shown in FIG. 4. The micrometer ring 31 is suitably attached to a standard microscope adjustment assembly. The objective lens 16 is supported from the micrometer ring 31 by means of a piezoelectric tube 32 which has one end attached to the micrometer ring and its other ring attached to the sleeve 34 suitably secured to the lens 16. The objective lens may be moved up and down by applying a voltage to the piezoelectric tube so that the focus position of the objective can be finely adjusted. The solid immersion lens assembly, previously described, is supported in a cup-shaped mounting assembly 36 which carries internal threads 37. The micrometer ring mounts a cylindrical member 39 having outer threads 40. The inner and outer threads have a different pitch and a differential screw 41 is threadably received by the threads. Rotation of the screw provides a differential movement whereby the position of the solid immersion lens can be accurately controlled.

Thus there has been provided a near field microscope assembly in which the resolution is improved by the use of a solid immersion lens. In one example, the lens was made of glass with the refractive index of 1.9 giving almost a 2:1 improvement in resolution. It is apparent that lenses made of other materials such as strontium titanate, or cubic lead sulfide with an index of refraction of 2.5 or gallium phosphide with a refractive index of 3.5 would provide an additional improvement in resolution.

Another application of the near field or solid immersion microscope of the present invention is with the use of infrared light and an infrared camera with a solid immersion lens made of silicon. In this case the microscope would be used to look into the interior of a solid transparent material of high refractive index, and not as a near-field microscope. For instance, it would be possible to focus an infrared 1.3 $\mu$m beam into the interior of a silicon sample with a definition the order of 0.2 $\mu$m and to possibly measure the doping profile in the silicon or to look at interior flaws. A second application of these microscopes is to use a solid immersion lens with a refractive index of approximately 1.6. This would match the refractive index of photoresist and permit focussing into the interior of photoresist. As shown in FIG. 5, this would enable one to view the trenches and holes 42 in the photoresist material 43 on the photoresist side rather than through the hole so as to improve the definition by 1/n where n is the refractive index. In this case, the lower corner of the trench would act as a corner reflector and would be imaged as a bright spot which could make it possible to determine its depth and transverse position.

Referring to FIG. 2, the use of an immersion lens in a real time scanning optical microscope configuration is shown. Real-time scanning microscopes are well known and have for example been described by in Pats. 3,517,980 and 3,926,500. An improved real time scanning microscope is also described in copending application Ser. No. 226,044 assigned to the same assignee.

Referring to FIG. 2, the scanning optical microscope includes an incoherent light source such as a mercury lamp 46 which projects light through a condenser lens 47 and polarizer 48 to beam splitter 49 which reflects the beam towards a Nipkow disk 51 which includes a plurality of pinholes. The light travelling through the pinholes is projected through quarter-wave plate 52 onto objective lens 53. The focussed beam is then integrated by the high refractive index solid immersion lens 54 and focussed on the object 56. The reflected light passes back through the pinholes through a stop 57 through a secondary objective lens 58 through an analyzer 59 and into the eyepiece of a trinocular microscope head. The polarizer, analyzer quarter-wave plate and the tilted Nipkow disk all contribute to eliminating background and stray light so that the background noise is reduced. The high refractive index solid immersion lens operates in the same manner as described above to provide improved resolution.

The advantage of using the solid immersion lens with the scanning optical microscope is to obtain the better contrast and transverse resolution of the scanning optical microscope. The same improvements of these quantities relative to the standard microscope will be obtained with the near-field or solid immersion microscope. In addition, since rays with an angle of incidence $\theta$ such that $\sin\theta < 1/n$, where n is the refractive index of the solid immersion lens, will pass into air and not have their amplitudes fall off exponentially in air, there will still be strong reflected signals from an object in air placed some distance from the solid immersion lens. With a scanning optical microscope, the reflected signal amplitude falls off rapidly when the object is moved away from the focal point. Thus, the use of the scanning confocal microscope configuration gives a further technique for differentiating against images which are not in the near field and would lack the improved resolution to be obtained with near-field microscopy. Since there will now be an exponential fall off in the received amplitude of the signal, it should be possible to use this rapid fall off of signal use in a feedback system to properly position the object within a small distance from the solid immersion lens.

We claim:

1. In an optical microscope including an objective lens closely spaced to an object to be viewed, the improvement comprising a high refractive index solid immersion lens having a spherical surface facing said objective lens and a flat front surface spaced from the spherical surface and passing through the geometrical center of the spherical surface disposed between the objective lens and the object being viewed to increase the resolution of the microscope by the factor $1/n$ where n is the refractive index of the solid immersion lens.

2. An optical microscope as in claim 1 wherein the refractive index of the solid immersion lens substantially matches that of the object being viewed.

3. An optical microscope as in claim 1 in which the solid immersion lens is silicon and the object is silicon.

4. An optical microscope as in claim 1 including means for mounting the solid immersion lens for yieldable vertical movement to protect the lens and object if they come into contact.

5. An optical microscope as in claim 1 wherein said optical microscope is a scanning optical microscope.

6. An optical microscope as in claim 1 in which the microscope is a near field real-time scanning optical microscope.

* * * * *

UNITED STATES PATENT AND TRADEMARK OFFICE
CERTIFICATE OF CORRECTION

PATENT NO. : 5,004,307

DATED : April 2, 1991

INVENTOR(S) : Gordon S. Kino and Scott M. Mansfield

It is certified that error appears in the above-identified patent and that said Letters Patent is hereby corrected as shown below:

At Column 1, line 3, after the title, insert the following:

--This invention was made with United States Government support under NSF Agreement No. ECS-8813558. The Goverment has certain rights in this invention.--

Signed and Sealed this

Twenty-second Day of December, 1992

Attest:

DOUGLAS B. COMER

*Attesting Officer*  *Acting Commissioner of Patents and Trademarks*

UNITED STATES PATENT AND TRADEMARK OFFICE
CERTIFICATE OF CORRECTION

PATENT NO. : 5,004,307

DATED : April 2, 1991

INVENTOR(S) : Kino, et al.

It is certified that error appears in the above-indentified patent and that said Letters Patent is hereby corrected as shown below:

At column 1, line 4, insert --This invention was made with Government support under Contract No. ECS-8813558 awarded by the National Science Foundation. The Government has certain rights in this invention.--

Signed and Sealed this

Twenty-fifth Day of April, 1995

BRUCE LEHMAN

*Attest:*

*Attesting Officer*           *Commissioner of Patents and Trademarks*